United States Patent
Marciano et al.

(10) Patent No.: US 11,062,440 B2
(45) Date of Patent: Jul. 13, 2021

(54) DETECTION OF IRREGULARITIES USING REGISTRATION

(71) Applicant: Smiths Detection France SAS, Vitry sur Seine (FR)

(72) Inventors: Abraham Marciano, Vitry sur Seine (FR); Najib Gadi, Vitry sur Seine (FR); Laurent Cohen, Paris (FR)

( * ) Notice: Subject to any disclaimer, the term of this patent is extended or adjusted under 35 U.S.C. 154(b) by 0 days.

(21) Appl. No.: 16/464,559

(22) PCT Filed: Nov. 24, 2017

(86) PCT No.: PCT/GB2017/053545
§ 371 (c)(1),
(2) Date: May 28, 2019

(87) PCT Pub. No.: WO2018/096355
PCT Pub. Date: May 31, 2018

(65) Prior Publication Data
US 2020/0226732 A1 Jul. 16, 2020

(30) Foreign Application Priority Data
Nov. 28, 2016 (GB) ..................................... 1620098

(51) Int. Cl.
*G06T 7/00* (2017.01)
*G06F 16/583* (2019.01)
*G01V 5/00* (2006.01)
(Continued)

(52) U.S. Cl.
CPC ............ *G06T 7/001* (2013.01); *G01V 5/0016* (2013.01); *G06F 16/5838* (2019.01);
(Continued)

(58) Field of Classification Search
CPC .. G06T 7/001; G06T 7/40; G06T 7/60; G06T 2207/30112; G06T 2207/30268;
(Continued)

(56) References Cited

U.S. PATENT DOCUMENTS 5,091,924 A * 2/1992 Bermbach ............ G01V 5/0008
348/127
10,497,144 B2 * 12/2019 Xu ...................... G06K 9/00791
(Continued)

FOREIGN PATENT DOCUMENTS

EP 3035087 A1 * 6/2016 ........... G06K 9/6215
EP 3128496 A1 2/2017
(Continued)

OTHER PUBLICATIONS

Ahmed, Wamiq M. et al, "Historical comparison of vehicles using scanned x-ray images," Applications of Computer Vision (WACV), 2011 IEE, Jan. 5, 2011 (Jan. 5, 2011), pp. 288-293.
(Continued)

*Primary Examiner* — Nizar N Sivji
(74) *Attorney, Agent, or Firm* — Kevin E. West; Advent, LLP

(57) ABSTRACT

In one embodiment there is provided a method for inspecting a container, comprising: classifying an inspection image of the container in a matching class of one or more predetermined classes of containers of interest, each predetermined class comprising reference images associated with a type of containers of interest, wherein the inspection image is generated using transmission of inspection radiation through the container; comparing a shape model of the inspection image to corresponding shape models associated with reference images within the matching class; associating the inspection image with a matching reference image, based on the comparison; registering one or more zones of the inspection image with corresponding one or more zones of the matching reference image; and mapping differences between the inspection image and the matching reference image, based on the registration.

19 Claims, 12 Drawing Sheets

(51) Int. Cl.
  *G06T 7/40* (2017.01)
  *G06T 7/60* (2017.01)
(52) U.S. Cl.
  CPC .......... *G06F 16/5854* (2019.01); *G06T 7/40* (2013.01); *G06T 7/60* (2013.01); *G06T 2207/30112* (2013.01); *G06T 2207/30268* (2013.01)
(58) Field of Classification Search
  CPC ......... G06T 7/0004; G06T 2207/30108; G06F 16/5838; G06F 16/5854; G06F 16/583; G01V 5/0016; G01V 5/0008; G01V 5/00
  See application file for complete search history.

(56) References Cited

U.S. PATENT DOCUMENTS

2013/0101172 A1* 4/2013 Parikh ............... G06Q 10/0838
                                                382/104
2017/0017667 A1* 1/2017 Chen ................... G01V 5/0016
2017/0046852 A1* 2/2017 Gadi ..................... G06K 9/00
2017/0160426 A1* 6/2017 Li ...................... G06K 7/10366
2017/0242148 A1* 8/2017 Yu ........................... G06T 7/62
2017/0294118 A1* 10/2017 Chen ................... G01V 5/0016

FOREIGN PATENT DOCUMENTS

| WO | 2016034022 A1 | 3/2016 |
|---|---|---|
| WO | 2016107474 A1 | 7/2016 |
| WO | 2016107475 A1 | 7/2016 |

OTHER PUBLICATIONS

PCT International Search Report and Written Opinion for PCT/GB2017/053545, dated Aug. 3, 2018.

* cited by examiner

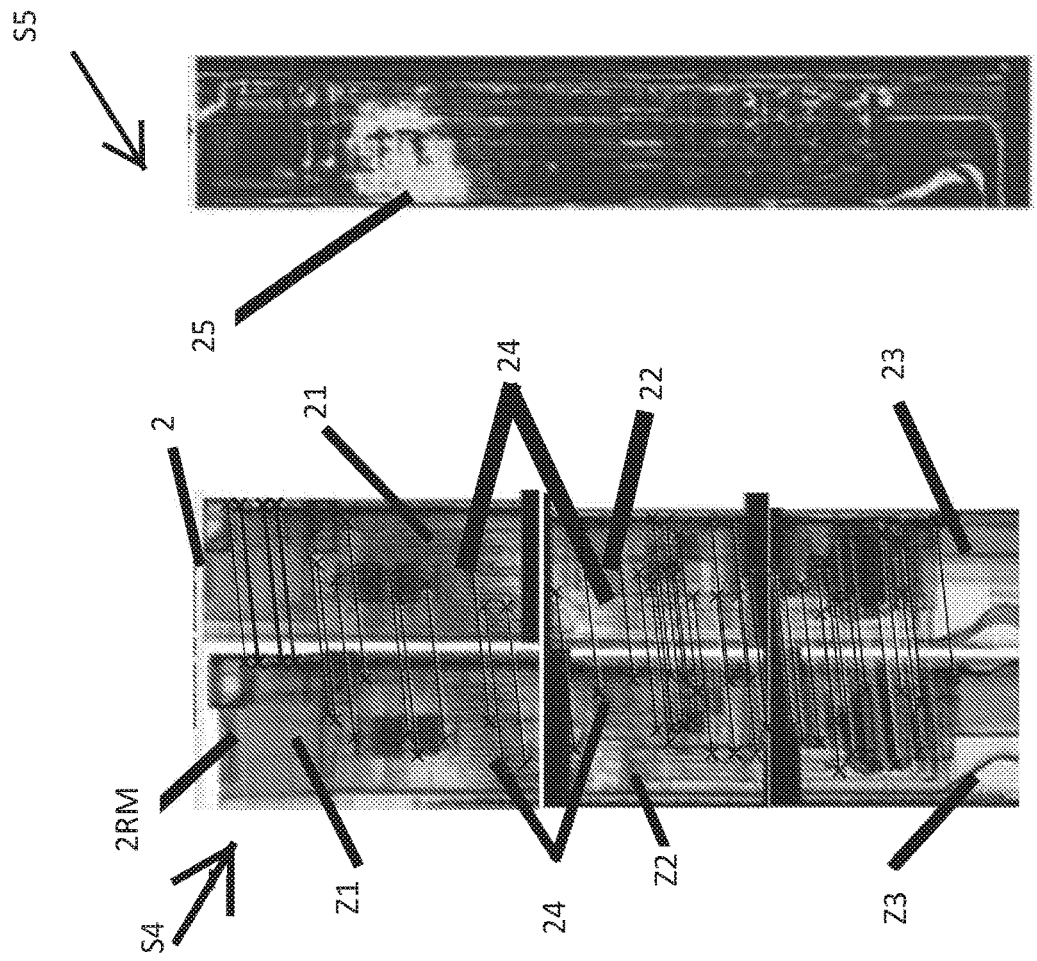
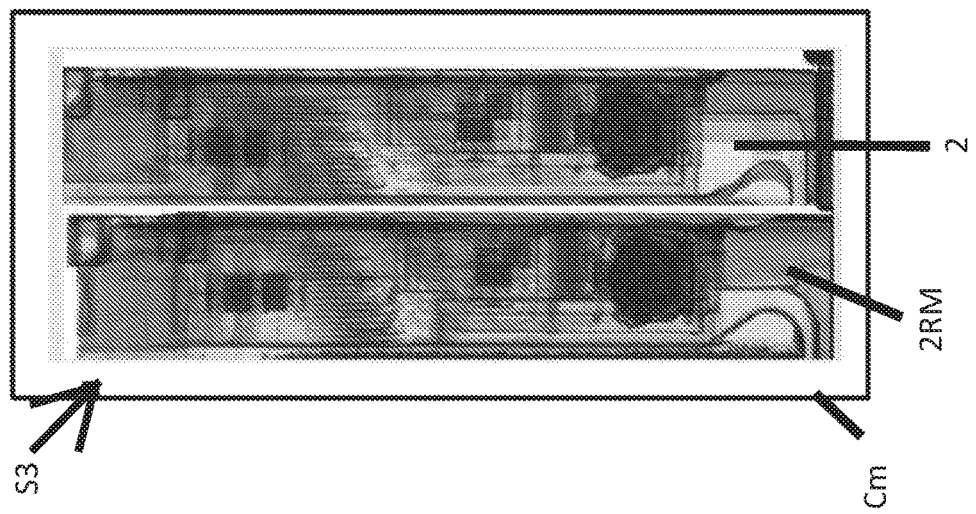
Figure 7
Figure 8
Figure 9

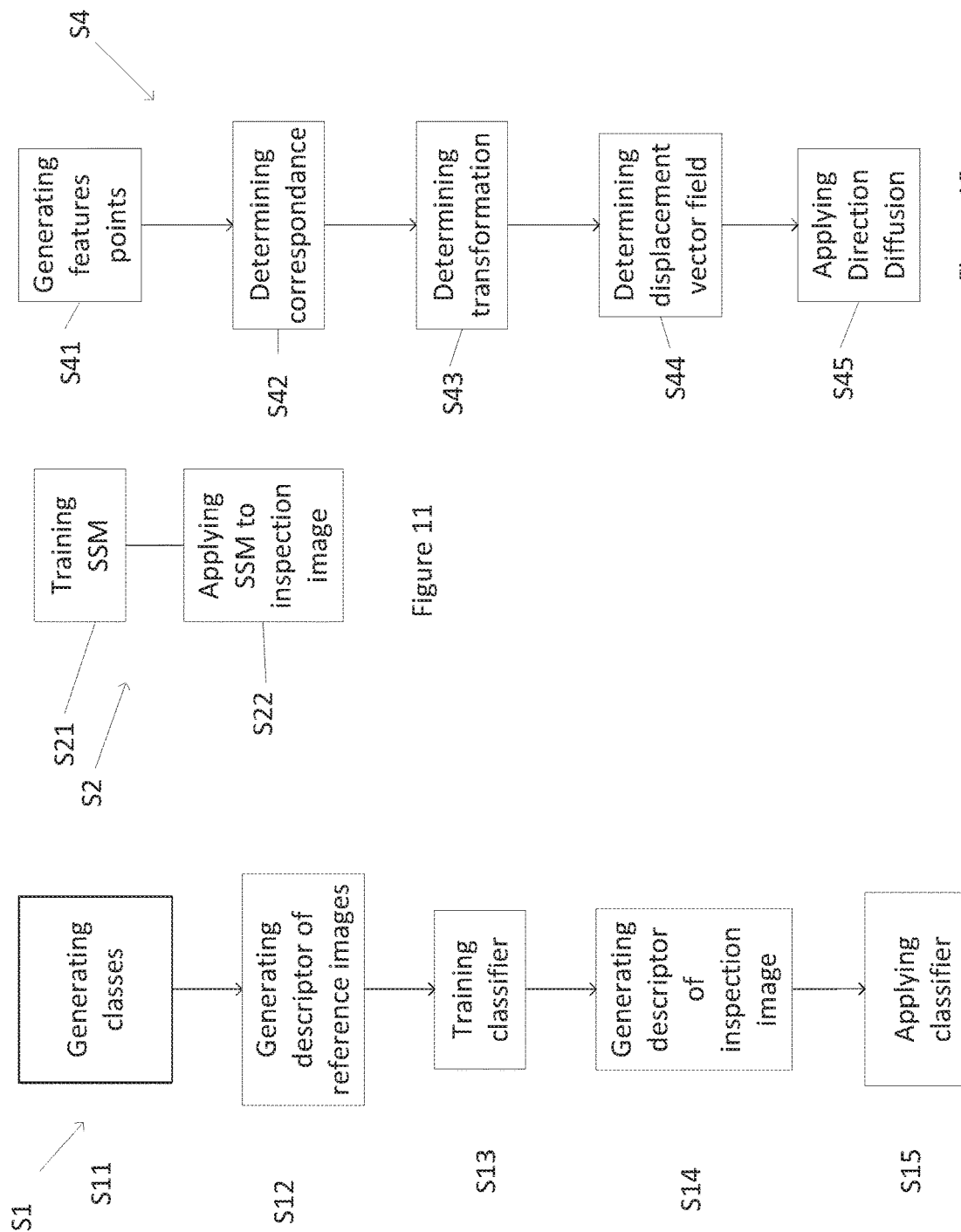

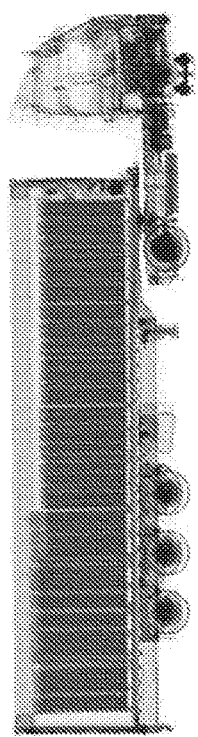 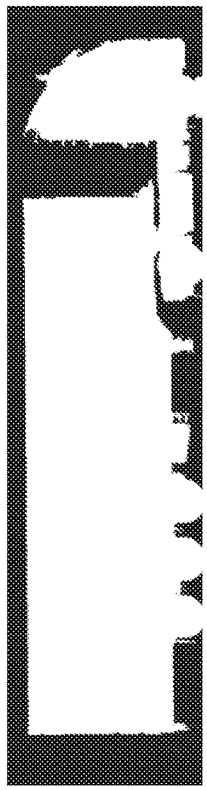 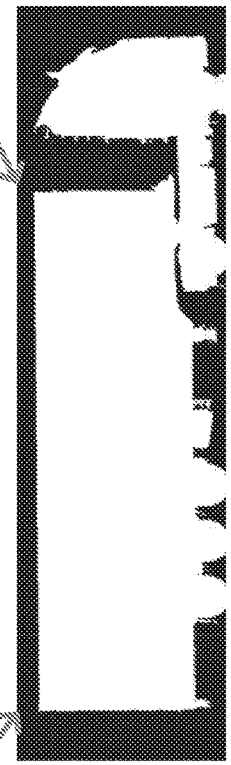 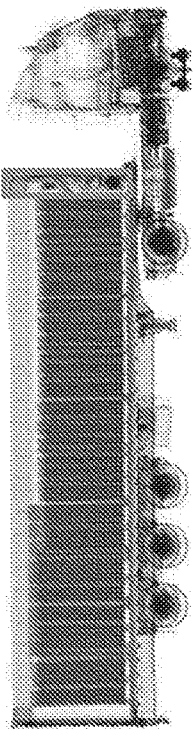
Figure 21A  Figure 21B  Figure 21C  Figure 21D
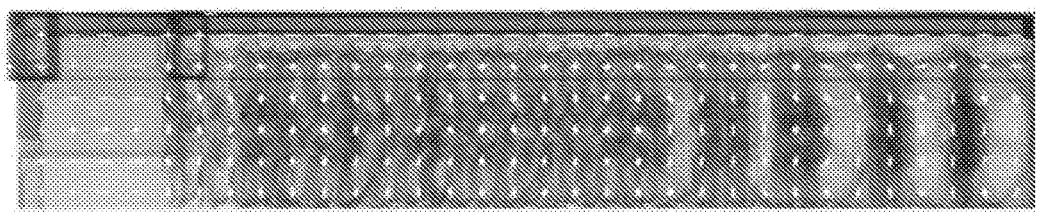
Figure 20B
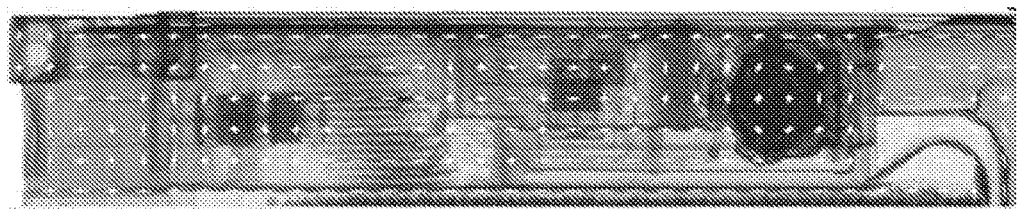
Figure 20A

US 11,062,440 B2

DETECTION OF IRREGULARITIES USING REGISTRATION

FIELD OF THE INVENTION

The present disclosure relates to methods and systems of inspection by transmission of radiation, and more particularly to inspection for detection of irregularities in a container.

BACKGROUND OF THE INVENTION

Known methods and systems of inspection use transmission of radiation through a container. It is sometimes difficult to detect threats (such as weapons or explosives) or contraband (such as cigarettes or drugs) when the threats or the contraband are placed in a container which has a complex pattern when inspected by transmission, such as a refrigeration unit or an engine of a vehicle.

PRESENTATION OF FIGURES

Embodiments of the disclosure will now be described, by way of example only, with reference to the accompanying drawings, in which:

FIG. 7 illustrates an example inspection image in accordance with the present disclosure being associated with a matching reference images in accordance with the present disclosure;

FIG. 8 illustrates an example matching reference image being registered with an inspection image in accordance with the present disclosure;

FIG. 9 illustrates mapped differences in accordance with the present disclosure;

FIG. 10 is a flowchart that illustrates a detail of an example method in accordance with the present disclosure;

FIG. 11 is a flowchart that illustrates a detail of an example method in accordance with the present disclosure;

Figure 12:
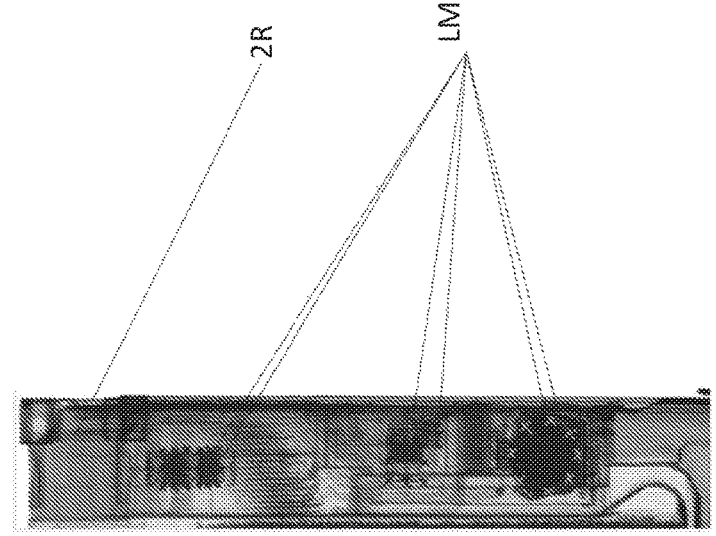
Figure 13:
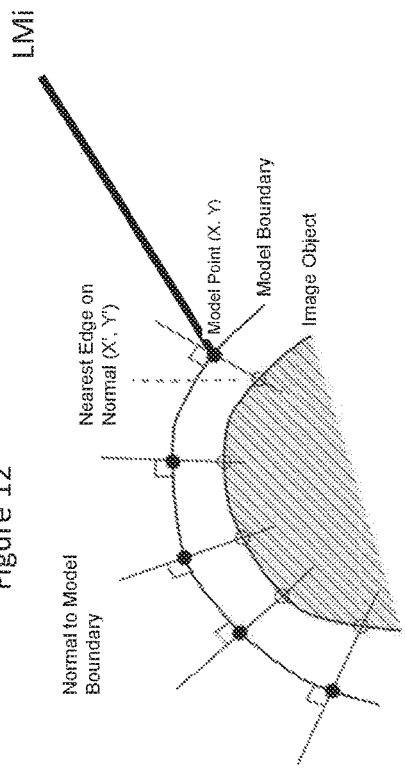
Figure 14:
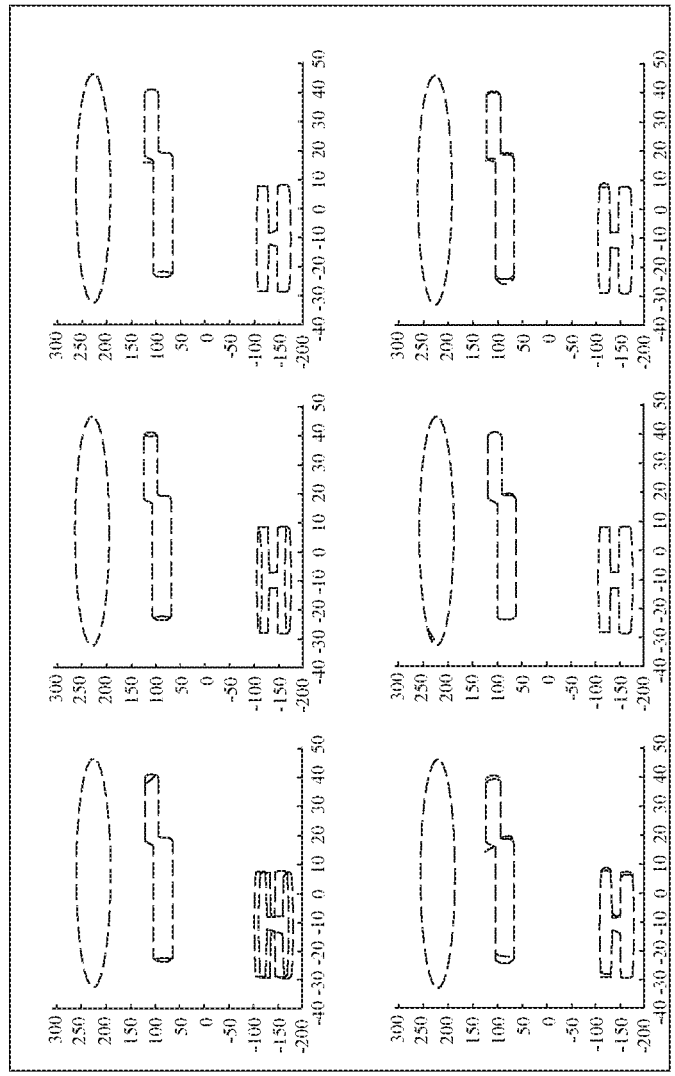
Figure 18A:
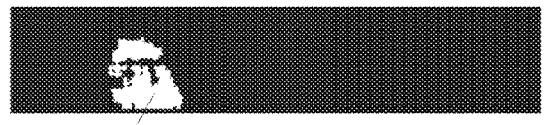
Figure 18B:
Figure 19:
Figure 17:
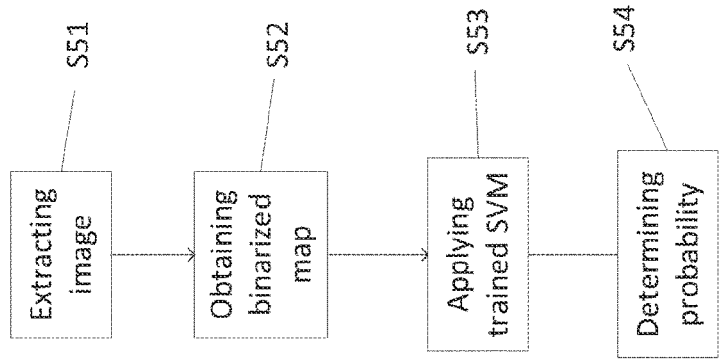
Figure 16B:
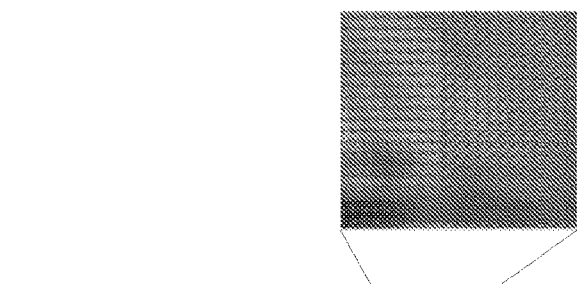
Figure 16A:
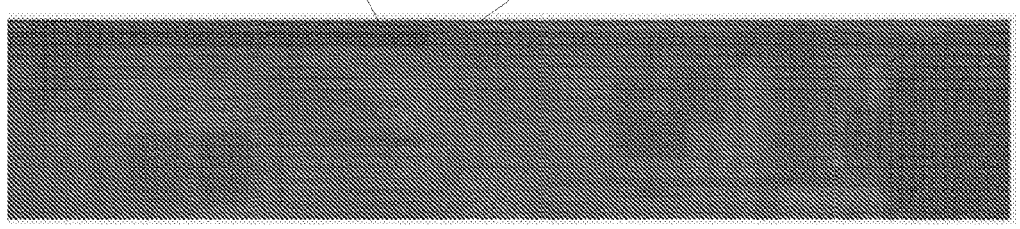

FIG. 12 schematically illustrates an annotation of a reference image in accordance with the present disclosure;

FIG. 13 schematically illustrates a Grey Level Profile corresponding to samples of a grey level profile along the normal to a shape defined by a landmark LMi;

FIG. 14 schematically illustrates shape representations in 6 modes, obtained after Procrustes Analysis;

FIG. 15 is a flowchart that illustrates a detail of an example method in accordance with the present disclosure;

FIG. 16A schematically illustrates an example displacement vector field;

FIG. 16B schematically illustrates a detail of the example displacement vector field of FIG. 16A;

FIG. 17 is a flowchart that illustrates a detail of an example method in accordance with the present disclosure;

FIG. 18A schematically illustrates an example of image obtained after applying an adaptive thresholding; and FIG. 18B schematically illustrates an example of image obtained after applying a morphological operation;

FIG. 19 schematically illustrates a final image as displayed to a user;

FIGS. 20A and 20B schematically illustrates examples of Histograms of Gradients;

FIG. 21A schematically illustrates an example initial image of a truck;

FIG. 21B schematically illustrates an example generated binary image;

FIG. 21C schematically illustrates a detection of points of interest in the binarized image of FIG. 21B; and FIG. 21D schematically illustrates a generation of a zone of interest.

In the Figures like reference numerals are used to indicate like elements.

DESCRIPTION OF EXAMPLE EMBODIMENTS

Overview

Embodiments of the disclosure relate to a method for inspecting a container. An inspection image of the container is classified in a class among predetermined classes of containers of interest. A model of the inspection image is compared to models of reference images contained within the class in which the inspection image has been classified. The closest reference image among the reference images is associated with the inspection image and registered with respect to the inspection image, to map differences between the inspection image and the closest reference image. In some examples, a classifier is applied to the mapped differences and a probability that the differences correspond to objects of interest is determined.

Detailed Description of Example Embodiments

Figure 1:
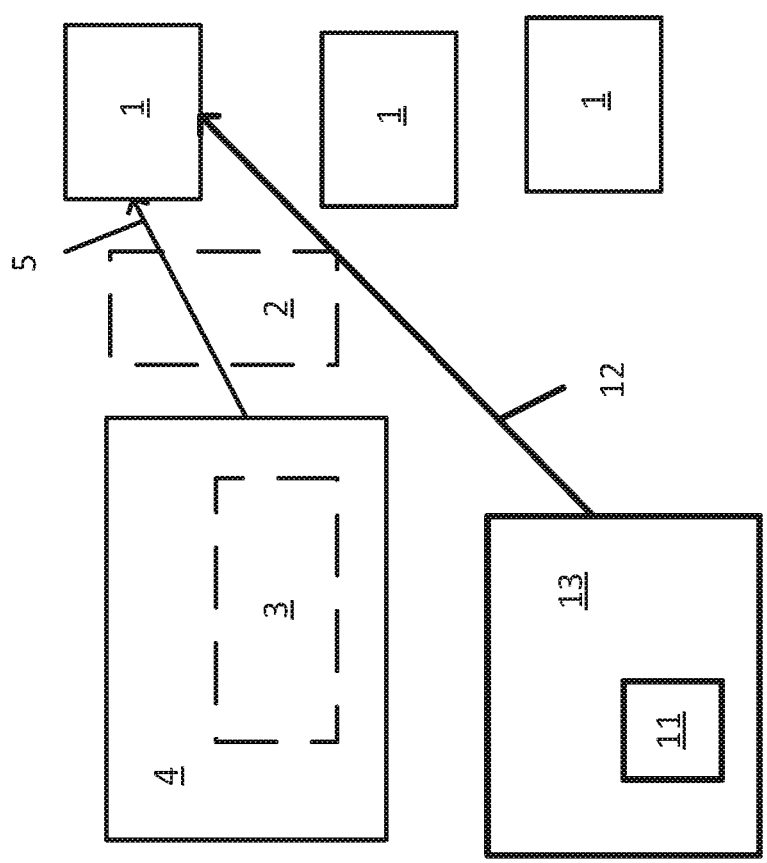
FIG. 1 is diagrammatic view that illustrates an example analyser in accordance with the present disclosure, configured to be connected to an inspection system in accordance with the present disclosure.

FIG. 1 illustrates an analyser 1 configured to inspect an inspection image 2 of a container 3.

Each of the images 2 may be generated by an inspection system 4 described in greater detail below.

As will be apparent in more detail below, the analyser 1 may be configured to receive the one or more images 2 from the system 4, for example over a communication network 5 which may be wired and/or may be wireless. The analyser 1 conventionally comprises at least a processor and a memory in order to carry out an example method according to the disclosure.

As explained in further detail below in relation to FIGS. 2 and 3, the inspection system 4 is configured to inspect the container 3 by transmission of inspection radiation 6 from an inspection radiation source 7 to an inspection radiation detector 8 through the container 3.

Figure 2:
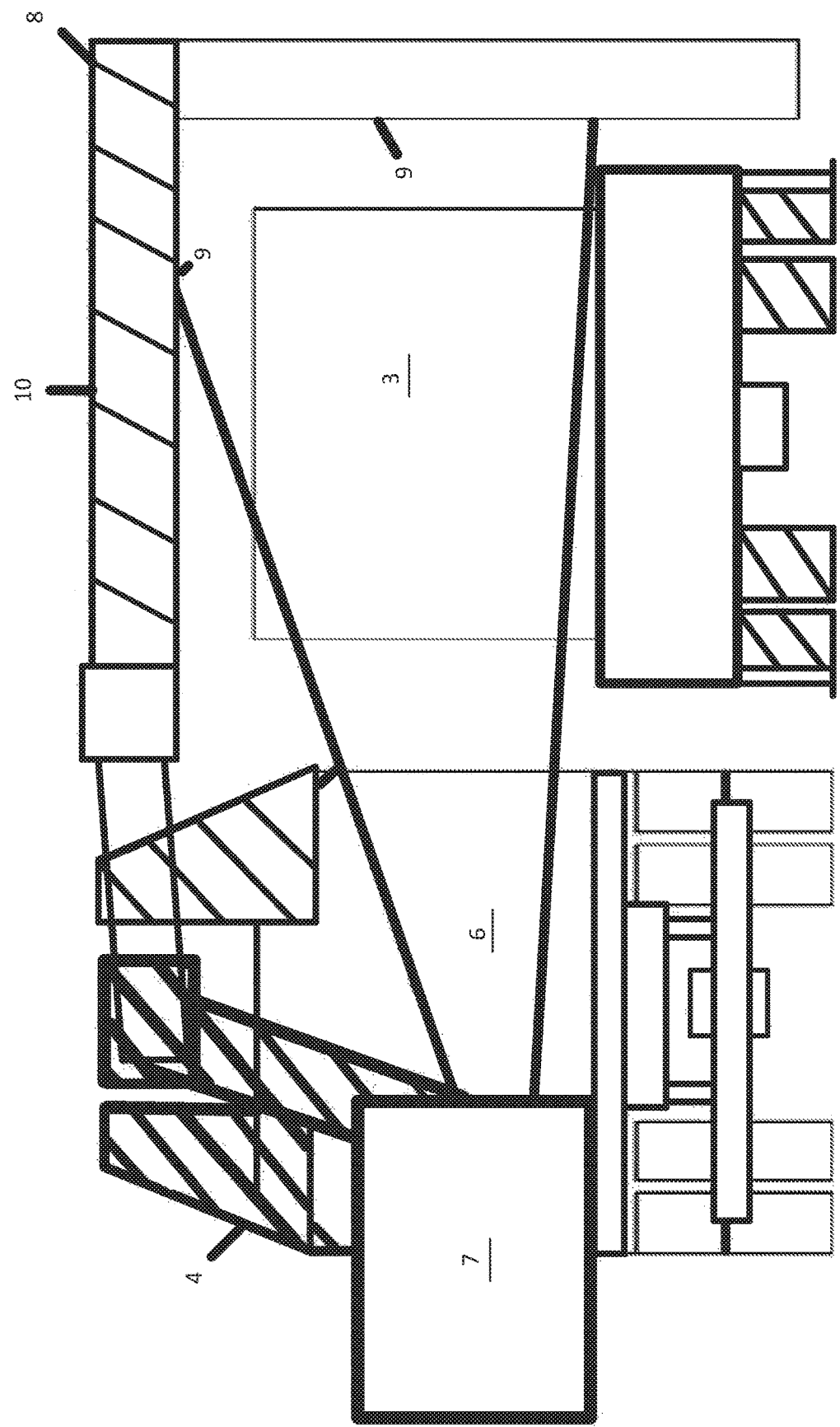
FIG. 2 is a rear view that illustrates an example of a mobile inspection system in accordance with the present disclosure, in an inspection mode.
Figure 3:
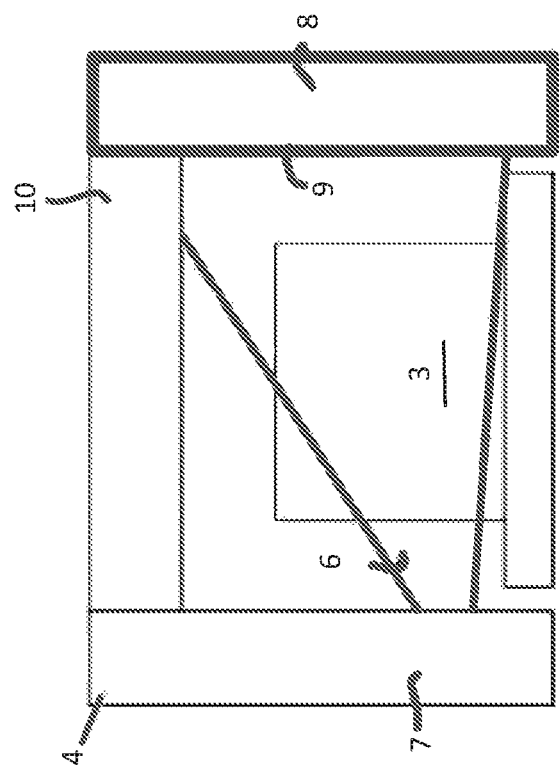
FIG. 3 is a rear view that illustrates an example of a static inspection system in accordance with the present disclosure, in an inspection mode.

FIGS. 2 and 3 illustrate that the container 3 may comprise a shipping container and/or a vehicle (such as a car and/or a van and/or a bus and/or a train and/or a truck) and/or a part of a shipping container and/or a vehicle (such as an engine and/or a boot lid and/or a hood and/or a roof and/or a floor and/or a wheel and/or a trailer and/or a refrigeration unit). It is appreciated that the container 3 may be any type of container, and thus may be a suitcase in some examples.

The radiation source 7 is configured to cause inspection of the container 3 through the material (usually steel) of walls of the container 3, e.g. for detection and/or identification of a load of the container and/or an object of interest. The object of interest may comprise threats (such as weapons or explosives) and/or contraband (such as cigarettes or drugs, etc.), as non-limiting examples.

The system 4 is configured to, in the inspection mode, cause inspection of the container 3, in totality (i.e. the whole container 3 is inspected) or partially (i.e. only a chosen part of the container is inspected). Partial inspection may be advantageous e.g., typically, when inspecting a vehicle, as a cabin of the vehicle may not be inspected to protect a driver of the vehicle from radiation, whereas a rear part of the vehicle is inspected.

In the example illustrated by FIG. 2, the inspection system 4 may be mobile and may be transported from a location to another location (the system 4 may comprise an automotive vehicle), and in the example illustrated by FIG. 3, the inspection system 4 may be static with respect to the ground and cannot be displaced.

A type of the inspection system 4 may be characterized by an energy and/or a dose of the inspection radiation 6.

In the examples illustrated by the Figures, the inspection radiation source 7 comprises an X-ray generator. The energy of the X-rays may be comprised between 300 keV and 15 MeV, and the dose may be comprised between 2 mGy and 20 Gy (Gray).

In the example illustrated by FIG. 2, the power of the X-ray source 7 may be e.g., between 500 keV and 9.0 MeV, typically e.g., 2 MeV, 3.5 MeV, 4 MeV, or 6 MeV, for a steel penetration capacity e.g., between 150 mm to 350 mm, typically e.g., 200 mm (7.9 in). In the example illustrated by FIG. 2, the dose may be e.g., between 20 mGy and 50 mGy.

In the example illustrated by FIG. 3, the power of the X-ray source 7 may be e.g., between 4 MeV and 10 MeV, typically e.g., 9 MeV, for a steel penetration capacity e.g., between 300 mm to 450 mm, typically e.g., 410 mm (16.1 in). In the example illustrated by FIG. 3, the dose may be 17 Gy.

In the examples illustrated by the Figures, the inspection radiation detector 8 comprises, amongst other conventional electrical elements, radiation detection lines 9, such as X-ray detection lines. The inspection radiation detector 8 may further comprise other types of detectors, such as optional gamma and/or neutrons detectors, e.g., adapted to detect the presence of radioactive gamma and/or neutrons emitting materials within the container 3, e.g., simultaneously to the X-ray inspection.

In the example illustrated in FIG. 2, the inspection radiation detector 8 may also comprise an electro-hydraulic boom 10 which can operate in a retracted position in a transport mode (not illustrated in the Figures) and in an inspection position (FIG. 2). The boom 10 may be operated by hydraulic activators (such as hydraulic cylinders).

In the example illustrated in FIG. 3, the inspection radiation detector 8 may also comprise a structure and/or gantry 10.

The detection lines 9 may be mounted on the boom 10 (FIG. 2) or structure and/or gantry 10 (FIG. 3), facing the source 7 on the other side of the container 3.

In order to inspect the container 3, in the example illustrated by FIG. 2, the system 4 may comprise a motion generation device so that the system 4 may be displaced, the container 3 being static (this mode is sometimes referred to as a 'scanning' mode). Alternatively or additionally, the motion generation device may cause the container 3 to be displaced, the system 4 being static with respect to the ground (FIG. 3). Alternatively or additionally, in a 'pass-through' mode the system 4 does not comprise a motion generation device and the container moves with respect to the system 4, the system 4 being static with respect to the ground.

Figure 4:
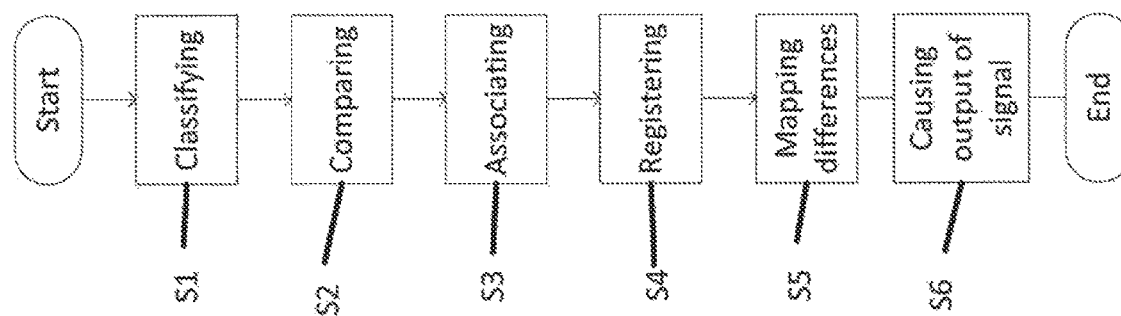
FIG. 4 is a flowchart that illustrates an example method in accordance with the present disclosure.
Figure 5:
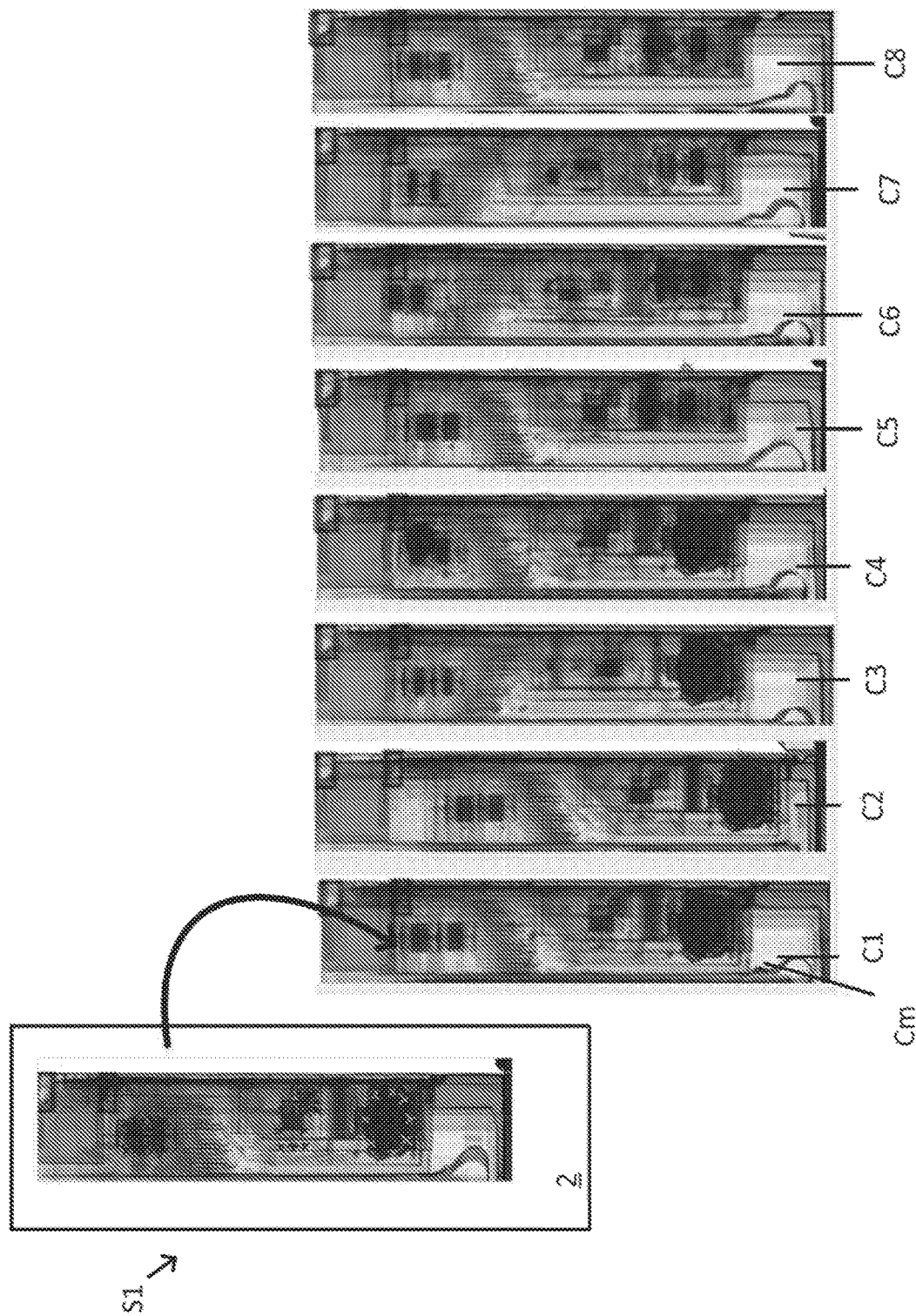
FIG. 5 illustrates an example inspection image in accordance with the present disclosure being classified in predetermined classes in accordance with the present disclosure.
Figure 6:
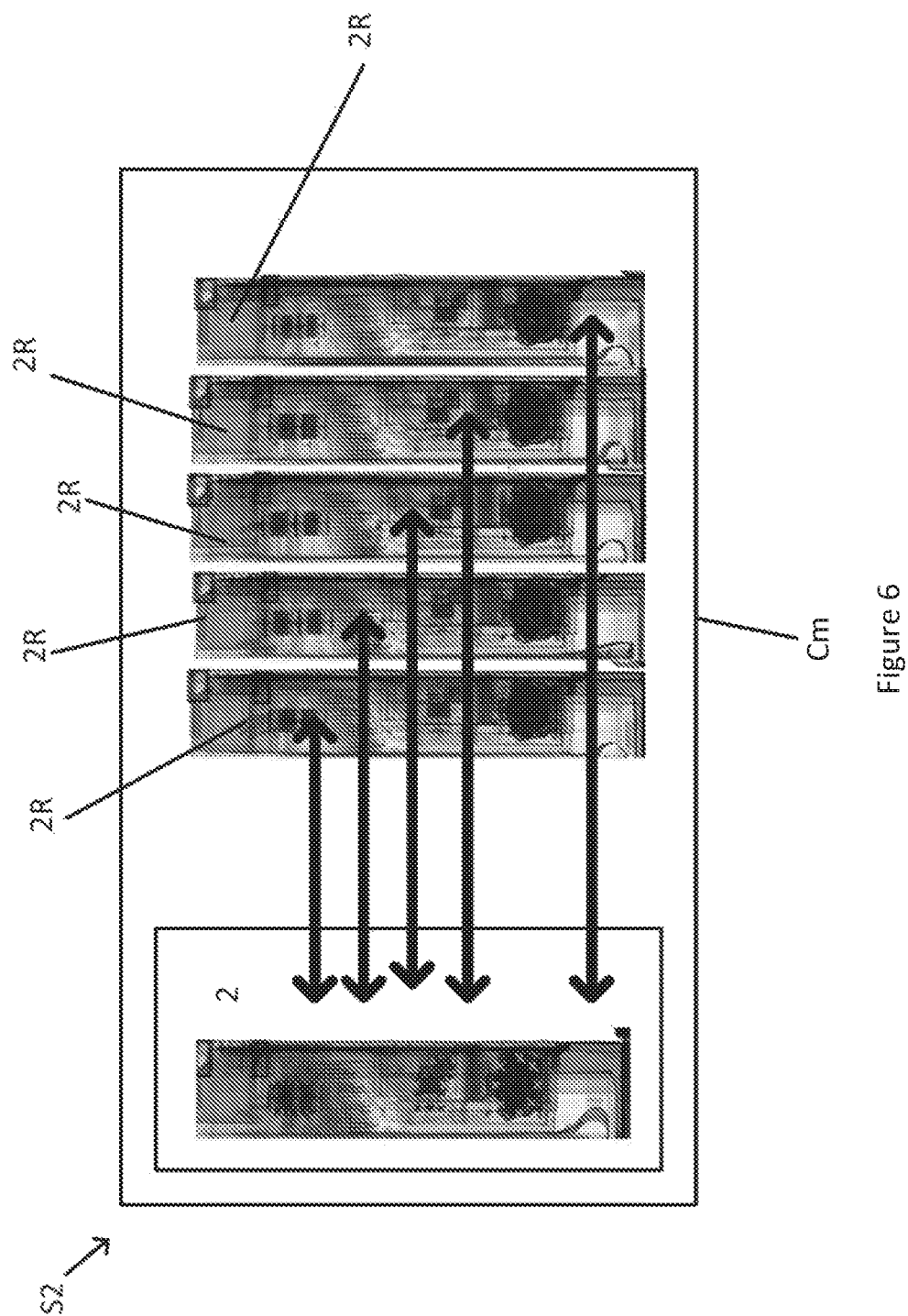
FIG. 6 illustrates an example inspection image in accordance with the present disclosure being compared with reference images in a matching class in accordance with the present disclosure.

The example method illustrated by FIGS. 4, 5 and 6 may comprise, at S1, classifying an inspection image 2 of the container 3 in a matching class Cm of one or more predetermined classes Cn of containers of interest.

In the example of FIG. 5, the type of containers of interest comprises a refrigeration unit of a vehicle. It should be understood that the disclosure may be applied to inspection images of other containers, such as images of cars for example.

There are several types of refrigeration units around the world. In Europe for example, ISO refrigeration units may be divided into 10 to 15 classes, and most common truck refrigeration unit may be divided into 15 classes. In the example of FIG. 5, n is comprised between 1 and 8, and the matching class Cm is the predetermined class C1.

As illustrated in FIG. 6, in some examples, each predetermined class Cn comprises reference images 2R associated with a type of containers of interest.

As illustrated in FIGS. 4 and 6, the method may also comprise, at S2, comparing a shape model of the inspection image 2 to corresponding shape models associated with reference images 2R within the matching class Cm.

As illustrated in FIGS. 4 and 7, the method may also comprise, at S3, associating the inspection image 2 with a matching reference image 2RM, based on the comparison.

As illustrated in FIGS. 4 and 8, the method may also comprise, at S4, registering one or more zones 21, 22 and 23 of the inspection image 2 with corresponding one or more zones Z1, Z2 and Z3 of the matching reference image 2RM.

As illustrated in FIGS. 4 and 9, the method may also comprise, at S5, mapping differences 25 between the inspection image 2 and the matching reference image 2RM, based on the registration.

As illustrated in FIGS. 5 and 10, classifying at S1 may comprise:
  generating, at S11, each predetermined class Cn by grouping reference images 2R associated with a type of containers of interest (such as a predetermined type of refrigeration unit);
  generating, at S12, a classification descriptor for each of the reference images, by extracting image features of the reference images 2R;
  training, at S13, a classifier by applying the classifier to the classification descriptor of each of the reference images 2R;
  generating, at S14, a classification descriptor for the inspection image, by extracting image features of the inspection image; and
  applying, at S15, the trained classifier to the classification descriptor of the inspection image.

In some examples, extracting the image features comprises using a pre-trained Convolutional Neural Network.

In some examples, the classifier trained at S13 and applied at S15 comprises a multi-class Support Vector Machine, SVM. The number of classes of the SVM is equal to the number of predetermined classes.

As shown by FIG. 6, once the inspection image 2 is classified in a matching class, there is still intra-class variability. Therefore, in some examples, comparing, at S2, the shape models may comprise using a statistical shape model, SSM.

In some examples, the SSM may comprise at least one of Active Shape Models, ASM, and/or Active Appearance Models, AAM, and/or Constrained Local Models, CLM.

Examples of SSM are known, for example from Cootes et al. in "Active Shape Models—Their Training and Application", published in 1995 in Computer Vision and Image Understanding, from Cootes et al. in "An Introduction to Active Shape Models", published in 2000 in Image Processing and Analysis, Oxford University Press, and from Van Ginneken et al. in "Active Shape Model Segmentation with Optimal Features", published in 2002 in Medical Imaging, IEEE Transactions.

As illustrated in FIGS. 6 and 11, using the SSM may comprise, at S21, training the SSM on the reference images 2R to obtain vectors of parameters of the reference images 2R. The vectors of parameters of e.g. N reference images 2R are referenced by pi, with i comprised between 1 and N.

In some examples, as shown in FIG. 12, training the SSM comprises, for each reference image 2R, annotating the reference image 2R by indicating one or more landmarks LM in the reference image 2R.

In some examples, training at S21 the SSM further comprises obtaining the vector of parameters pi based on the annotation of the reference image.

Obtaining the vector of parameters pi of an image, for example a reference image 2R, comprises:
  stacking coordinates associated with the one or more landmarks LM to obtain a distribution model of the landmarks;
  stacking Grey Level Profiles associated with each landmark to obtain a vector of the grey levels of the landmarks; and
  approximating the distribution model and the vector of the grey levels by applying a Principal Component Analysis to the stacks.

In some examples, the coordinates may be coordinates (x, y) of each landmark in the reference image 2R.

Examples of Grey Level Profiles are known, for example from from Cootes et al. in "An Introduction to Active Shape Models", published in 2000 in Image Processing and Analysis, Oxford University Press. As shown in FIG. 13, each Grey Level Profile may correspond to samples of a grey level profile along the normal to a shape defined by a landmark LMi.

In some examples, obtaining the vector of parameters pi may further comprise applying Procrustes Analysis prior to approximating the distribution model. FIG. 14 shows shape representations in 6 modes, obtained after Procrustes Analysis.

As shown in FIGS. 6 and 11, using the SSM may comprise, at S22, applying the trained SSM to the inspection image 2 to obtain a vector of parameters of the inspection image. The vector of parameters of the inspection image 2 is referenced by $p_{im}$. Obtaining the vector of parameters $p_{im}$ of the inspection image 2 comprises the same steps as the steps performed to obtain the vector of parameters pi of the reference images 2R.

In some examples, associating, at S3, the inspection image 2 with the matching reference image 2RM comprises applying a k-nearest neighbours, k-NN, algorithm on the obtained shape vectors pi and $p_{im}$, i.e. the obtained shape vector $p_{im}$ of the inspection image and the shape vectors pi of the reference images.

The obtained vectors of parameters have a low dimension (for example 4 or 5 dimensions). Each of the vectors pi can thus be compared with the vector $p_{im}$, and the nearest neighbour pNN among the vectors pi can be identified.

In some examples, in the registration performed at S4 the inspection image 2 is considered as a fixed image, while the matching reference image 2RM is considered as a moving image. This may reduce the risk that an object of interest in the inspection image could be deformed or attenuated.

In some examples, both fixed and moving images may be split into different zones, and the registration performed at S4 may thus be assimilated to a piecewise-rigid model.

As shown in FIGS. 8 and 15, registering, at S4, the one or more zones (e.g. zones 21, 22 or 23) of the inspection image 2 with the corresponding one or more zones (e.g. zones Z1, Z2 or Z3) of the matching reference image 2RM comprises, for each zone of the inspection image 2 and for each corresponding zone of the matching reference image 2RM:
  generating, at S41, feature points 24;
  determining, at S42, a correspondence between the features points 24 of the zone of the inspection image 2 and the features points 24 of the zone of the matching reference image 2RM; and
  determining, at S43, a transformation from the zone of inspection image to the zone of the matching reference image, based on the determining.

In some examples, the feature points 24 may comprise at least one of Scale-Invariant Feature Transform (SIFT) points or Speeded Up Robust Features (SURF) points. Iteratively, SIFT or SURF feature points are generated, and a correspondence is determined for corresponding zones of the inspection image and of the matching reference image. In some example, a filtering algorithm, such as the algorithm known as RANdom SAmple Consensus (RANSAC) algorithm may be used to filter outlier correspondences.

In some examples, registering, at S4, may further comprise for each zone of the matching reference 2RM:
  determining, at S44, a displacement vector field, based on the determination of the transformation; and
  applying, at S45, a Direction Diffusion method to the displacement vector field.

An example of the determined displacement vector field is shown in FIGS. 16A and 16B. The displacement vector field may be dense, with discontinuities at boundaries between the zones Z1, Z2 and Z3 in the matching reference image 2RM.

The Direction Diffusion method applied at S45 enables to obtain a smoother field. An example of Direction Diffusion method is known from Tang et al. "Direction Diffusion", published in 1999 in Computer Vision. It may normalize the displacement vectors and evolve simultaneously the isotropic diffusion equation for both X and Y components of the field I:

$$\frac{\partial I_i}{\partial t} = \Delta I_i + I_i \|\nabla I\|$$

for i=1 and i=2, where i=1 is associated with the X component of the displacement vector field, and i=2 is associated with the Y component of the displacement vector field.

The application of a Gaussian kernel with a maximum value at the boundaries may also avoid the normalization at other regions of the image 2RM.

In some examples, as shown in FIG. 17, mapping, at S5, the differences 25 comprises:
- extracting, at S51, an image of the mapped differences 25, as described in more detail below;
- obtaining, at S52, a binarized map of the mapped differences 25;
- applying, at S53, a trained binary Support Vector Machine, SVM, to the binarized mapped differences 25; and
- determining, at S54, a probability that the difference corresponds to an object of interest, based on the application of the SVM.

In some examples, extracting at S51 may comprise extracting an image Diff of the difference between the inspection image 2 and the registered matching reference 2RM image by determining:

$$\text{Diff} = I_{Reg} - I_{fixed}$$

where $I_{Reg}$ is associated with the registered matching reference image 2RM, and $I_{fixed}$ is associated with the inspection image 2.

Alternatively or additionally, extracting at S51 may comprise extracting an image Div of the division of the inspection image 2 by the registered matching reference image 2RM by determining:

$$Div = 1 - Irr, \text{ with } Irr = \frac{Ifixed}{IReg}.$$

The image Div derives from Lambert's law.

An example of the image Diff is shown in FIG. 9.

As shown by FIGS. 9, 17, 18A and 18B, the method may further comprise obtaining, at S52, the binarized map of the mapped differences. In some examples obtaining the binarized map at S52 comprises applying an adaptive thresholding to the extracted image (for example the image Diff illustrated, e.g. in FIG. 9—but this could also be applied to the image Div), to obtain the image illustrated in FIG. 18A. In some examples, the method may further comprise, at S52, applying a morphological operation to the extracted image after the adaptive threshold has been applied, i.e. the image illustrated in FIG. 18A, to obtain the image of the binarized mapped differences 25 illustrated in FIG. 18B.

Each binarized mapped difference 25 in the image shown in FIG. 18B corresponds to a region containing a potential object of interest, such as a threat or contraband.

Applying at S53 the trained SVM may comprise applying the binary SVM on the mapped differences 25 obtained by the binarization performed at S52, as shown in FIGS. 18A and 18B.

In some examples, training, the binary SVM comprises:
- predetermining criteria of the mapped differences 25; and/or
- predefining one or more locations of the mapped differences in the reference images.

In some examples, the criteria comprise at least one of: a size, a shape, an intensity or a texture. During the training, the SVM will learn to discard binarized mapped differences 25 as false alarms if the binarized mapped differences 25 do not meet the criteria, for example because they are too small (such as smaller than 10 cm×10 cm, depending on the container and the objects of interest) or are too faint on the image, or because they are located in certain locations (this relies on the knowledge about specific locations of the containers which are unlikely to contain e.g. illicit products).

After the trained SVM is applied at S53, a probability that the mapped difference corresponds to an object of interest, based on the application of the SVM, is determined at S54.

As shown by FIG. 19, the method may further comprise outputting a signal, based on the mapping, for example derived from the steps performed at S54. The signal may be configured to cause a visual alarm, such as the display of the square 26 on the inspection image 2, indicating the location of an object of interest. Alternatively or additionally, the signal may be configured to cause an aural alarm, to attract attention of a user when an object of interest is found. A user may thus search the container for checks.

In some examples, the method may comprise, prior to the classifying performed at S1, determining that the inspection image 2 corresponds to a container of interest by:
- extracting an Histogram of Gradients; and
- comparing the extracted Histogram of Gradients with Histograms of Gradients associated with containers of interest.

Examples of Histograms of Gradients are known from Dalal et al. "Histograms of Oriented Gradients for Human Detection", published in 2005 in Computer Vision and Pattern Recognition. Examples are also shown in FIGS. 20A and 20B. In FIG. 20A, the Histogram of Gradients corresponds to a container of interest (e.g. a refrigeration unit), whereas in FIG. 20B, the Histogram of Gradients does not correspond to a container of interest. The comparing may comprise using a trained SVM.

In the disclosure above, the inspection image initially corresponds to a container to be inspected, such as an initial image of a refrigeration unit. As illustrated in FIG. 21A, it may be the case that the initial inspection image does not correspond to the container to be inspected, for example an initial image of a truck is inspected and only the refrigeration unit of the truck is of interest. In such examples, the method may further comprise generating the inspection image by selecting a zone of interest in an initial image of the container. As illustrated in FIGS. 21B to 21D, the selecting may comprise:
- a binarization of the initial image (as shown in FIG. 21B);
- a detection of points of interest in the binarized image, such as the corners of the trailer (as shown in FIG. 21C);
- a generation of the zone of interest, based on the detection (as shown in FIG. 21D); and
- a cropping of the initial image, based on the generation.

As shown in FIG. 1, it will be appreciated that in examples of the method in accordance with the disclosure, the analyser 1 may be configured to retrieve the reference images from a database 11 over a communication network 12, thanks to a communication server 13 configured to provide a remote data management system. Alternatively or additionally, the database 11 may be at least partially located in the analyser 1.

In the example illustrated by FIG. 1, the server 13 may also provide access to the database 11 to a plurality of geographically distributed analysers 1, over the network 12.

In some examples, the database 11 may be populated by inspection images inspected by the inspection system 4. This enables enriching and/or updating the database 11.

Alternatively or additionally, the inspection image 2 may be retrieved by the analyser 1 from the database 11.

The disclosure may be applied to situations where a container (such as shipping container or a vehicle) is inspected by a system 4 (for example defined by an energy spectrum and a geometry), at a first location. The analyser 1 may perform the comparison of the inspection image 2 with the reference images 2R stored in the database 11, regardless of the location of the analyser 1 and/or the database 11 with respect to the system 4. In some examples, the analyser 1 and/or the database 11 may be at a second location, different from the first location. In some examples, the reference images 2R correspond to inspection images inspected by a system similar or identical, in terms of energy spectrum and/or geometry, to the system 4.

Variations and Modifications

Other variations and modifications of the system or the analyser will be apparent to the skilled in the art in the context of the present disclosure, and various features described above may have advantages with or without other features described above.

For example, the analyser 1 and/or the database 11 may, at least partly, form a part of the inspection system 4.

It is understood that the inspection radiation source may comprise sources of other radiation, such as gamma rays or neutrons. The inspection radiation source may also comprise sources which are not adapted to be activated by a power supply, such as radioactive sources, such as using Co60 or Cs137.

As one possibility, there is provided a computer program, computer program product, or computer readable medium, comprising computer program instructions to cause a programmable computer to carry out any one or more of the methods described herein. In example implementations, at least some portions of the activities related to the analyser 1 and/or the communications networks 5 and/or 12 herein may be implemented in software. It is appreciated that software components of the present disclosure may, if desired, be implemented in ROM (read only memory) form. The software components may, generally, be implemented in hardware, if desired, using conventional techniques.

In some examples, components of the analyser 1 and/or the communications networks 5 and/or 12 may use specialized applications and hardware.

As will be apparent to the skilled in the art, the server 13 should not be understood as a single entity, but rather refers to a physical and/or virtual device comprising at least a processor and a memory, the memory may be comprised in one or more servers which can be located in a single location or can be remote from each other to form a distributed network (such as "server farms", e.g., using wired or wireless technology).

In some examples, one or more memory elements (e.g., the database 11 and/or the memory of the processor) can store data used for the operations described herein. This includes the memory element being able to store software, logic, code, or processor instructions that are executed to carry out the activities described in the disclosure.

A processor can execute any type of instructions associated with the data to achieve the operations detailed herein in the disclosure. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

The communications network 5 and the communications network 12 may form only one network.

The data received by the analyser 1 may be typically received over a range of possible communications networks 5 and/or 12 at least such as: a satellite based communications network; a cable based communications network; a telephony based communications network; a mobile-telephony based communications network; an Internet Protocol (IP) communications network; and/or a computer based communications network.

In some examples, the communications networks 5 and/or 12 and/or the analyser 1 may comprise one or more networks. Networks may be provisioned in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network.

The above embodiments are to be understood as illustrative examples, and further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for inspecting a container, comprising:
classifying an inspection image of the container in a matching class of one or more predetermined classes of containers of interest, each predetermined class comprising reference images associated with a type of containers of interest,
wherein the inspection image is generated using transmission of inspection radiation through the container,
the classifying comprising applying a trained classifier to a classification descriptor of the inspection image generated by extracting image features of the inspection image;
comparing a shape model of the inspection image to corresponding shape models associated with reference images within the matching class, the comparing the shape models performed using a statistical shape model, SSM, the step of using the SSM comprising:
training the SSM on the reference images to obtain vectors of parameters of the reference images; and
applying the trained SSM to the inspection image to obtain a vector of parameters of the inspection image;
associating the inspection image with a matching reference image, based on the comparison;
registering one or more zones of the inspection image with corresponding one or more zones of the matching reference image; and
mapping differences between the inspection image and the matching reference image, based on the registration.

2. The method of claim 1, wherein classifying comprises:
generating each predetermined class by grouping reference images associated with a type of containers of interest;
generating a classification descriptor for each of the reference images, by extracting image features of the reference images; and
training a classifier by applying the classifier to the classification descriptor of each of the reference images.

3. The method of claim 2, wherein classifying further comprises:
generating a classification descriptor for the inspection image, by extracting image features of the inspection image.

4. The method of claim 2, wherein extracting the image features comprises using a pre-trained Convolutional Neural Network.

5. The method of claim 2, wherein the classifier comprises a multi-class Support Vector Machine.

6. The method of claim 1, further comprising, prior to the classifying, determining that the inspection image corresponds to a container of interest by:
extracting an Histogram of Gradients; and
comparing the extracted Histogram of Gradients with Histograms of Gradients associated with containers of interest.

7. The method of claim 1, wherein comparing the statistical shape model, SSM, comprises at least one of:
Active Shape Models, ASM; and/or
Active Appearance Models, AAM; and/or
Constrained Local Models, CLM.

8. The method of claim 1, wherein associating the inspection image with the matching reference image comprises applying a k-nearest neighbours, k-NN, algorithm on the obtained shape vectors.

9. The method of claim 1, wherein registering the one or more zones of the inspection image with the corresponding one or more zones of the matching reference image comprises, for each zone of the inspection image and for each corresponding zone of the matching reference image:
generating feature points;
determining a correspondence between the features points of the zone of the inspection image and the features points of the zone of the matching reference image;
determining a transformation from the zone of inspection image to the zone of the matching reference image, based on the determining.

10. The method of claim 1, wherein mapping the differences comprises:
extracting an image Diff of the difference between the inspection image and the registered matching reference image by determining:

$$\text{Diff} = I_{Reg} - I_{fixed}; \text{ and/or}$$

extracting an image Div of the division of the inspection image by the registered matching reference image by determining:

$$Div = 1 - Irr, \text{ with } Irr = \frac{I_{fixed}}{I_{Reg}}$$

where $I_{Reg}$ is associated with the registered matching reference image; and
$I_{fixed}$ is associated with the inspection image.

11. The method of claim 10, further comprising obtaining a binarized map by:
applying an adaptive thresholding to the extracted image; and
applying a morphological operation to the extracted image after the adaptive threshold has been applied.

12. The method of claim 11, further comprising:
applying a trained binary Support Vector Machine, SVM, to the binarized map; and
determining a probability that the differences correspond to objects of interest, based on the application.

13. The method of claim 1, further comprising generating the inspection image by selecting a zone of interest in an initial image of the container.

14. The method of claim 13, wherein the selecting comprises:
a binarization of the initial image;
a detection of points of interest in the binarized image;
a generation of the zone of interest, based on the detection; and
a cropping of the initial image, based on the generation.

15. The method of claim 1, wherein the container comprises at least one of:
a shipping container;
a vehicle; or
a part of at least one of a shipping container or a vehicle.

16. The method of claim 1, further comprising:
outputting a signal, based on the mapping.

17. The method of claim 1, further comprising receiving the inspection image and/or the reference images from at least one of:
an inspection system configured to inspect the container; or
a database.

18. The method of claim 1, wherein the inspection radiation through the container comprises:
an energy comprised between 300 keV and 15 MeV; and
a dose comprised between 2 mGy and 20 Gy.

19. An analyser comprising a processor and a memory, configured to carry out a method comprising:
classifying an inspection image of the container in a matching class of one or more predetermined classes of containers of interest, each predetermined class comprising reference images associated with a type of containers of interest,
wherein the inspection image is generated using transmission of inspection radiation through the container,
the classifying comprising applying a trained classifier to a classification descriptor of the inspection image generated by extracting image features of the inspection image;
comparing a shape model of the inspection image to corresponding shape models associated with reference images within the matching class, the comparing the shape models performed using a statistical shape model, SSM, the step of using the SSM comprising:
training the SSM on the reference images to obtain vectors of parameters of the reference images; and
applying the trained SSM to the inspection image to obtain a vector of parameters of the inspection image;
associating the inspection image with a matching reference image, based on the comparison;
registering one or more zones of the inspection image with corresponding one or more zones of the matching reference image; and mapping differences between the inspection image and the matching reference image, based on the registration.

\* \* \* \* \*